United States Patent [19]

Emery et al.

[11] Patent Number: 4,853,818

[45] Date of Patent: Aug. 1, 1989

[54] SYSTEM AND METHOD FOR DETECTING ARCING IN DYNAMOELECTRIC MACHINES

[75] Inventors: Franklin T. Emery, Pittsburgh; Ronald T. Harrold, Murrysville Boro, both of Pa.

[73] Assignee: Electric Power Research Institute, Inc., Palo Alto, Calif.

[21] Appl. No.: 211,541

[22] Filed: Jun. 23, 1988

Related U.S. Application Data

[63] Continuation-in-part of Ser. No. 947,197, Dec. 29, 1986, Pat. No. 4,771,355.

[51] Int. Cl.[4] ............................................. H02H 7/00
[52] U.S. Cl. ........................................ 361/33; 361/6; 361/23; 324/546; 340/658; 340/660
[58] Field of Search .................... 361/23, 31, 33, 20, 361/21, 6; 324/158 MG, 545, 546; 340/657, 658, 660, 661

[56] References Cited

U.S. PATENT DOCUMENTS

| 3,710,242 | 1/1973 | Povey | 324/60 R |
|---|---|---|---|
| 3,801,899 | 4/1974 | Liao | 324/54 X |
| 3,882,379 | 5/1975 | Kang | 325/536 |
| 4,156,846 | 5/1979 | Harrold et al. | 361/31 X |
| 4,237,415 | 12/1980 | Easley | 324/62 |
| 4,356,443 | 10/1982 | Emery | 361/31 X |
| 4,446,426 | 5/1984 | Emery et al. | 361/31 X |
| 4,771,355 | 9/1988 | Emery et al. | 361/33 |

FOREIGN PATENT DOCUMENTS

1058890 2/1967 United Kingdom .

Primary Examiner—Derek S. Jennings
Attorney, Agent, or Firm—Flehr, Hohbach, Test, Albritton & Herbert

[57] ABSTRACT

System and method for detecting arcing faults in a dynamoelectric machine by monitoring the neutral lead of the machine for a radio frequency voltage produced by arcing, providing a warning signal in response to a change in the radio frequency voltage, and providing a shutdown signal in response to a radio frequency voltage greater than a predetermined level. An RF voltage coupler is capacitively coupled ot the neutrla lead, and a radio frequency monitor connected to the voltage coupler detects peaks in the RF voltage.

22 Claims, 5 Drawing Sheets

FIG_1

FIG_9

FIG_3

FIG_4

FIG_5

FIG_6

FIG_7

FIG_8

SYSTEM AND METHOD FOR DETECTING ARCING IN DYNAMOELECTRIC MACHINES

This is a continuation-in-part of Ser. No. 947,197, filed Dec. 29, 1986, now U.S. Pat. No. 4,771,355.

This invention pertains generally to dynamoelectric machines and more particularly to a system and method for detecting arcing faults in large dynamoelectric machines such as turbine generators.

Arcing in a large dynamoelectric machine such as a turbine generator can lead to extensive damage to the machine which can result in a costly, long-term outage of the machine. Internal arcing can, for example, be caused by insulation failure, copper fatigue or voltage breakdown due to reduced clearances between components operating at different potentials. The arcing generally is not continuous, but is interrupted and reignited at a 120 Hz rate due to movement of the surfaces between which the arcing occurs and the cyclic nature of the arc voltage.

It has been found that arcing in a dynamoelectric machine causes short duration voltage pulses containing radio frequency (RF) signal components to be developed at the neutral point of the machine. The neutral has been found to be a good location for RF measurements because it is at a low potential with respect to ground and because arcing at any location in the generator causes an RF voltage at the neutral point of the machine. The RF components produced by arcing are generally greater in level than RF voltages which are otherwise present on the neutral lead.

U.S. Pat. No. 4,156,846 discloses a method of detecting the occurrence of arcing faults by monitoring the RF current in the neutral grounding lead of the generator. This method utilizes the fact that neutral currents due to arcing have a characteristic frequency distribution which can be predicted from the resonant characteristics of the current path and is distinctly different from the frequency distribution of neutral currents resulting from other causes such as corona discharge within insulation voids. By monitoring the neutral current for this characteristic frequency distribution, the occurrence of an arcing fault can be detected at a relatively early stage.

The neutral grounding lead is commonly connected to the ground by a grounding transformer, and the relatively high impedance of the transformer limits the magnitude of the neutral RF current. This limits the sensitivity and ability to detect an arcing fault in the stator winding. With a dry-type neutral transformer, the ability to detect an arcing fault is less than it is with an oil-filled transformer due to the substantially higher impedance of a dry-type transformer. With the replacement of oil-filled neutral transformers with dry-type transformers, it is becoming increasingly difficult to detect arcing faults with an RF current monitoring technique.

It is in general an object of the invention to provide a new and improved system and method for detecting arcing faults in a dynamoelectric machine.

Another object of the invention is to provide a system and method of the above character which overcome the limitations and disadvantages of techniques heretofore employed for detecting arcing faults.

These and other objects are achieved in accordance with the invention by monitoring the neutral lead of a dynamoelectric machine for a radio frequency voltage produced by arcing in the machine, providing a warning signal in response to a change in the radio frequency voltage, and providing a shutdown signal in response to a radio frequency voltage greater than a predetermined level. An RF voltage coupler is capacitively coupled to the neutral lead, and a radio frequency monitor connected to the voltage coupler detects peaks in the RF voltage.

Figure 1:
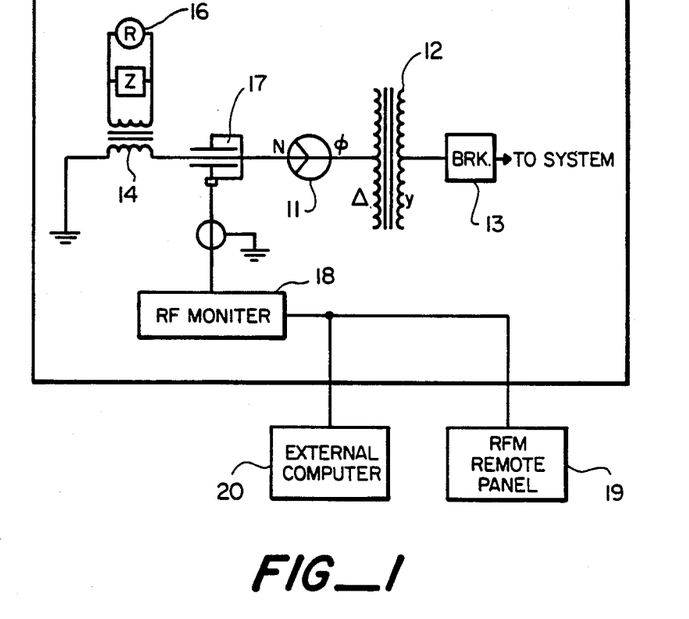
FIG. 1 is a block diagram illustrating a monitoring system according to the invention in connection with a turbine generator.

In FIG. 1, the invention is illustrated in connection with a turbine generator 11 which has phase ($\Phi$) and neutral (N) leads. Although only one phase lead is shown for convenience of illustration, the generator typically has three phase windings which are connected in a three-phase circuit. The three-phase power from the generator is delivered to a distribution system through a transformer 12 and a circuit breaker 13 at the generator unit. The neutral lead is connected to ground by a grounding transformer 14, with a ground detection relay 16 being coupled to this transformer.

A high frequency voltage coupler 17 is capacitively coupled to the neutral lead to monitor the RF voltage in the neutral lead. The output of the voltage coupler is connected to the input of an RF monitor 18 which is positioned close to the neutral connection of the generator. The monitor is enclosed within a sealed metal housing which shields the monitor from electromagnetic and radio frequency interference and is also dust proof. The monitor delivers output signals to a remote panel 19 and an external computer 20 which are located away from the generator.

Under normal generator operating conditions, the voltage between the generator neutral point and ground is on the order of 300 volts RMS. This voltage is developed by the third harmonic (180 Hz) current flow resulting from slight imbalance in the phase currents. A generator fault condition can cause the neutral voltage to increase to the full output voltage of the machine which in some cases can be as high as 30 Kv RMS. In contrast, the RF voltages produced at the neutral point by arcing faults are on the order of millivolts.

In order to safely and accurately measure RF voltages at the neutral point of an on-line generator, the RF voltage coupler must be capable of measuring RF voltages at a level on the order of millivolts, while continuously withstanding and blocking third harmonic (180 Hz) voltages of up to about 600 volts RMS. At the 60 Hz operating frequency of the machine, the combined impedance of the coupling circuit and the RF voltage monitor should be at least ten times greater than the high frequency impedance of the neutral transformer to prevent the voltage coupler from affecting the ground protection scheme of the generator. The RF voltage coupler should also be capable of blocking the generator line-to-ground voltage (30 Kv RMS) from the RF monitor for a time of at least 100 milliseconds to prevent shunting of the neutral ground protection circuitry during the occurrence of a generator fault condition. In addition, the voltage coupler should have a known transfer function when used in conjunction with the RF monitor and should have a coupling capacitance of at least 20 picofarads, with negligible shunt capacitance.

Figure 3:
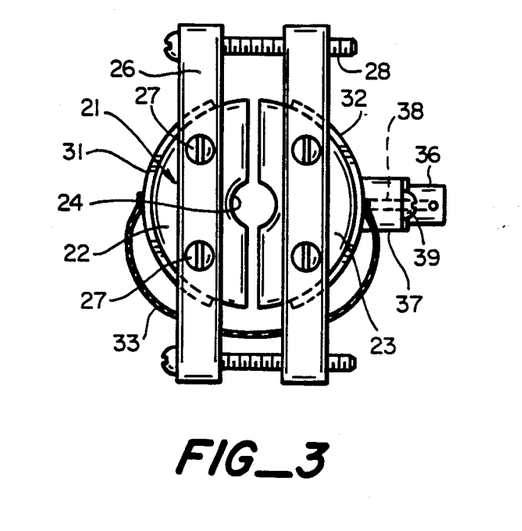
FIG. 3 is top plan view of one embodiment of an RF voltage coupler for use in the monitoring system of FIG. 2.
Figure 4:
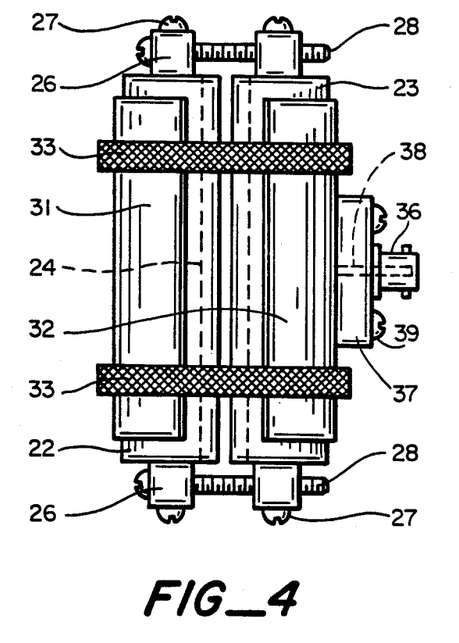
FIG. 4 is a side elevational view of the voltage coupler of FIG. 3.
Figure 5:
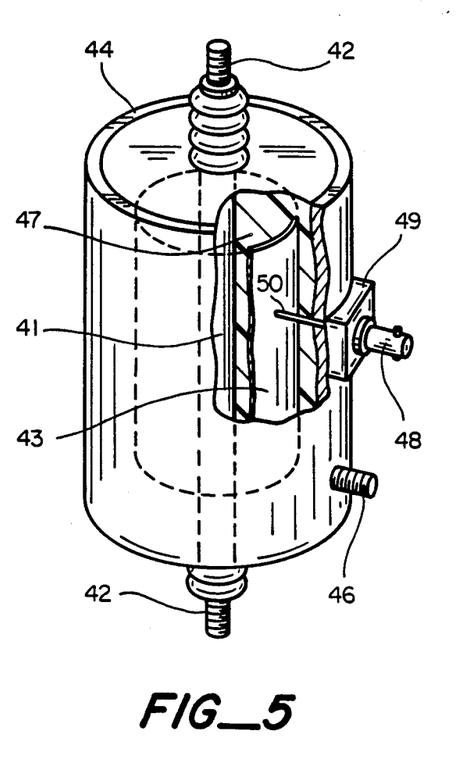
FIG. 5 is an isometric view, partly broken away, of another embodiment of RF voltage coupler which can be used in the monitoring system of FIG. 2.

In the preferred embodiments, the voltage coupler 17 comprises a coaxial capacitor, with neutral grounding lead 17 forming one plate of the capacitor. FIGS. 3-4 illustrate an embodiment of a coaxial capacitor which can be clamped onto a neutral lead, and FIG. 5 illustrates a coaxial capacitor which can be can be connected permanently in series with the neutral lead.

In the embodiment of FIGS. 3-4, the voltage coupler has a split body 21 having a pair of generally semicylindrical body sections 22, 23 with an axial bore 24 adapted to receive the neutral lead or conductor of the generator. With a bore diameter of 0.375 inch, the coupler can be used with neutral conductor from about 0.375 inch to 1.0 inch in diameter. Parallel bars 26 are affixed to the upper and lower ends of body sections 22, 23 by screws 27, and draw bolts 28 extend between the parallel bars and provide means for drawing the two body sections together.

Body sections 22, 23 are fabricated of an electrically insulative material having a high dielectric strength. In one presently preferred embodiment, the body sections are fabricated of a Micarta material having a dielectric strength of approximately 350 volts/mil. With a radial thickness of 0.675 inch, the body sections have a dielectric strength of about 236 Kv which is more than adequate for most installations. In this embodiment, bars 26 are also fabricated of Micarta, and screws 27, 28 are fabricated of nylon. Semi-cylindrical plates 31, 32 are affixed to the outer surfaces of body sections 22, 23 and positioned coaxially of the neutral conductor received in bore 24. These plates are fabricated of an electrically conductive material such as brass, and they are connected together electrically by braided copper conductors 33. An electrical connection with the outer plates is made by a BNC connector 36 mounted an insulative block 37 on plate 32. The connector has an inner conductor 38 which is connected electrically to plate 32. Mounting block 37 is secured to plate 32 and body section 23 by screws 39. In this particular embodiment, block 37 is fabricated of Micarta, and screws 39 are fabricated of nylon.

The capacitance of the voltage coupler is given by the relationship $$C = \frac{5.56 \, K \times 10^{-13}}{\log_n (b/a)}$$

where K is the dielectric constant of the insulative material, a is the radius of the center conductor, b is the radius of the outer conductor or plate, and the capacitance is given in units of farads per centimeter of length. With a Micarta body and outer plates having a diameter of 1.75 inch and a length of 2.75, the capacitor has a capacitance on the order of 13.3-17.6 pF, depending upon the diameter of the neutral conductor.

The voltage coupler illustrated in FIG. 5 has an axially extending center conductor 41 with threaded terminals 42 for connection to the neutral conductor of the generator. In one presently preferred embodiment, the center conductor 41 is fabricated of a copper rod having a diameter of 0.375 inch.

A cylindrical outer conductor 43 is positioned coaxially about center conductor 41, and these two conductors form the plates of the coaxial capacitor. The outer conductor is fabricated of an electrically conductive material such as brass, and in a presently preferred embodiment it has a diameter of 2.375 inches and a length of 4.0 inches.

A cylindrical outer shield 44 prevents external signal interference from reaching the voltage coupler. This shield has a terminal 46 for connection to ground. In the embodiment discussed above, this shield has a diameter of 4.375 inches and a length of 5.50 inches. The region within the shield is filled an epoxy material 47.

Electrical connections with outer conductor 43 are provided by a BNC connector 48 mounted on an insulative block 49 on the outer shield. This connector has an inner conductor 50 which is connected electrically to plate 43.

The capacitance of the voltage coupler of FIG. 5 is determined by the same relationship as the capacitance of the voltage coupler of FIGS. 3-4. With the dimensions given above, the voltage coupler of FIG. 4 has a capacitance on the order of 20 pF.

Figure 2:
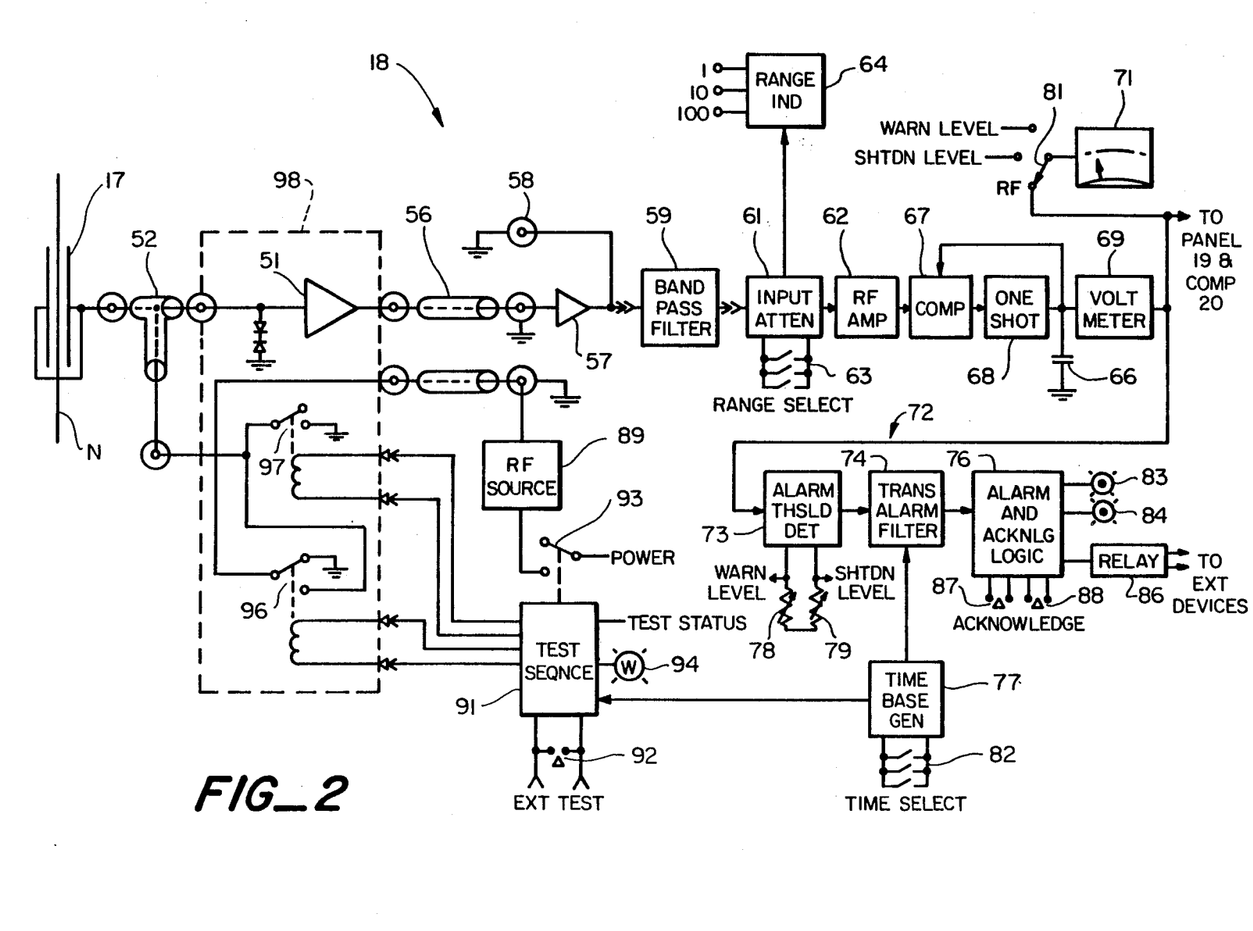
FIG. 2 is a block diagram of the monitoring system in the embodiment of FIG. 1.
Figure 6:
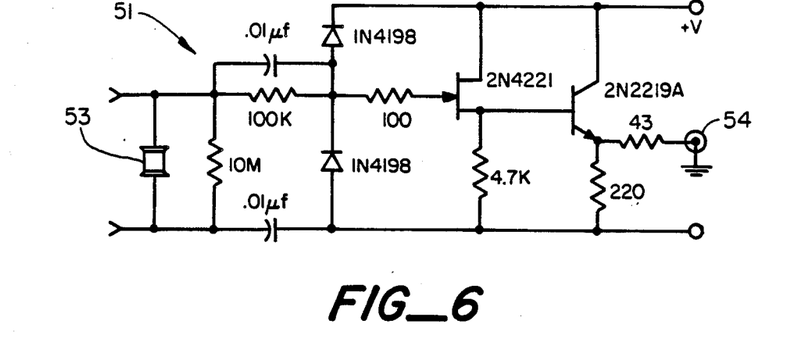
FIG. 6 is a circuit diagram an impedance matching amplifier in the monitoring system of FIG. 2.

As illustrated in FIG. 2, the voltage coupler 17 is connected to the input of an impedance matching amplifier 51 by a T-connector 52. This amplifier has an input impedance on the order of 10 megohms and an output impedance of 50 ohms, with a wideband frequency response from about 5 KHz to at least 10 MHz and a voltage gain on the order of unity. The circuit of a suitable amplifier for use in this application is shown in FIG. 6. With the component values indicated in this figure, the amplifier has an input impedance of 10 MHz, an output impedance of 50 ohms, a frequency response of about 1 KHz to 20 MHz, and a voltage gain of about 0.5. A spark gap 53 having a breakdown voltage of 90 volts is connected between the input terminals of the amplifier to provide voltage breakdown protection. The output of the amplifier is taken at the emitter of the 2N2219A transistor and is applied to an output terminal 54 such as a connector for a coaxial cable.

A coaxial cable 56 connects the output of impedance matching amplifier 51 to the input of an isolation amplifier 57. A connector 58 is connected to the output of the isolation amplifier and mounted on the front panel of the monitor for connection to the input of a spectrum analyzer (not shown). A spectrum analyzer typically has an input impedance of 50 ohms, and the isolation amplifier therefore preferably has an output impedance of 50 ohms.

Figure 7:
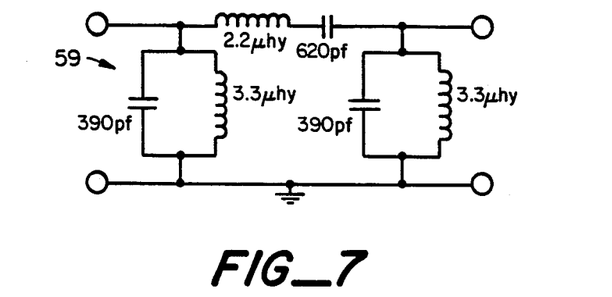
FIG. 7 is a circuit diagram of a bandpass filter in the monitoring system of FIG. 2.

A bandpass filter 59 is connected to the output of isolation amplifier 57. This filter is the primary band limiting element in the monitor, and it controls the overall frequency response of the monitor. It prevents the normal background RF noise of the generator from reaching the stages which follow. In the embodiment illustrated, the bandpass filter is a passive filter, and it is constructed in plug-in form so that the frequency response of the monitor can be changed, if necessary. The frequency response of the filter is preferably as flat as possible between the 3 dB high and low cutoff frequency points. A suitable filter is shown in FIG. 7. With the component values indicated, this filter has a lower cutoff frequency of about 2 MHz and an upper cutoff frequency of about 10 MHz.

The output signal from bandpass filter 59 passes through an input attenuator 61 to an RF amplifier 62. Range selection switches 63 determine the amount of attenuation provided, and the degree of attenuation is indicated by range indicator lights 64 on the front panel of the monitor. Amplifier 62 is a wide band RF amplifier having a frequency response from about 100 KHz to 10 MHz.

The output of RF amplifier 62 is applied to a peak detector comprising a storage capacitor 66, a comparator 67 and a one-shot multivibrator 68. The output of the amplifier is connected to one input of the comparator, and the output of the comparator is connected to the trigger input of the one-shot multivibrator. The output of the one-shot is connected to one side of the capacitor, and this side of the capacitor is connected to a second input of the comparator. The other side of the capacitor is grounded. The comparator thus compares the charge on the capacitor with the input signal from RF amplifier 62. When the charge on the capacitor is below the level of the input signal, the comparator triggers the one-shot to apply a small step charge to the capacitor. The voltage on the capacitor is thus compared with each incoming pulse, and the charge on the capacitor is increased until it equals the input pulse height. As the capacitor loses its charge, it is recharged by the comparator and the one-shot to the level of the input pulses. The voltage on the capacitor thus represents the peak value of the input signal, and this corresponds to the peak level of the RF signal produced by arcing in the generator.

Figure 8:
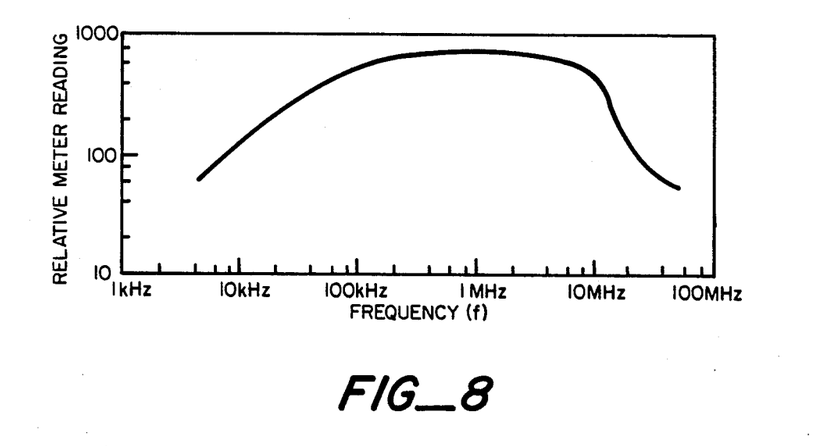
FIG. 8 is a graphical representation of the frequency response of the of the monitoring system of FIG. 2.

The signal stored on capacitor 66 is amplified by a voltmeter 69 and displayed by an RF level meter 71 on the front panel of the monitor. The frequency response of the voltmeter is shown in FIG. 8, and the meter is calibrated in RF level from 0% to 100% full scale. The output from voltmeter 69 is also supplied to remote panel 19 and external computer 20.

The amplified output signal from voltmeter 69 is also supplied to an alarm circuit 72 which comprises a threshold detector 73, a transient alarm filter 74, an alarm and acknowledge logic circuit 76, and a time base generator 77. The alarm circuit provides two levels of annunciation of internal arcing conditions in the monitored machine. The first level is a warning level which indicates that a change in RF activity has occurred. The warning level can be adjusted from 0 to full scale of the RF level and, when exceeded, provides a warning indication to the operator and allows time for assessment and response. The second level of annunciation is a shutdown level corresponding to an RF magnitude indicative of severe internal arcing. The shutdown level is likewise adjustable from 0 to full scale of the RF level. Separate comparators are included in the threshold detector for each of the two alarm levels, and potentiometers 78 and 79 are connected to the threshold detector for setting the threshold levels for the respective comparators. The threshold signals from the potentiometers can be selectively applied to panel meter 71 by a switch 81 to display the levels to which the controls are set.

In the event that the output signal from the RF signal level amplifier in voltmeter 69 exceeds either the warning threshold level or the shutdown threshold level, threshold detector 73 delivers an output signal to transient alarm filter 74. The transient alarm filter is a variable delay circuit comprising counter circuits and clock circuits controlled by time base generator 77. These circuits are set to provide a delay time for each of the two comparators, and the output signals from the comparators must exist for a time greater than the programmed delay times in order to be recognized as valid alarm condition signals. Time selection switches 82 determine the lengths of the delays, and in one presently preferred embodiment, the delays can be set from 0 seconds (no delay) to 30 seconds in increments of 2 seconds.

The output of the transient alarm filter is connected to the input of alarm and acknowledge logic circuit 76. This circuit drives a warning indicator light 83, a shutdown indicator light 84, and a relay 86. Indicator lights 83 and 84 are mounted on the front panel of the monitor and on remote panel 19, and the relay provides alarm signals to external devices such as computer 20. Alarm acknowledgement switches 87 and 88 provide means for an operator to indicate his awareness of an alarm condition. When either a warning signal or a shutdown signal is received, the logic circuit causes the corresponding light 83 or 84 to flash. When the existence of an alarm condition is acknowledged by an operator via switch 87 or 88, the flashing stops, and the light glows steadily. The lights remain on until the RF level drops to a level below the threshold level which produced the alarm. In the event that the RF level drops below the threshold level before acknowledgement by the operator has occurred, the flashing continues until acknowledgement has been received. If the alarm has been acknowledged, when the RF returns to normal, the flashing continues and requires the operator to acknowledge that the alarm level has cleared.

Means is provided for testing the operation of the monitor. This means includes an RF power source 89 and a test sequence controller 91. A test switch 92 mounted on the front panel of the monitor is connected to the sequence controller to initiate a test sequence. Operating power is supplied to the RF source via a relay contact 93 which is controlled by the sequence controller, and a panel mounted lamp 94 is illuminated when a test is in process.

Figure 9:
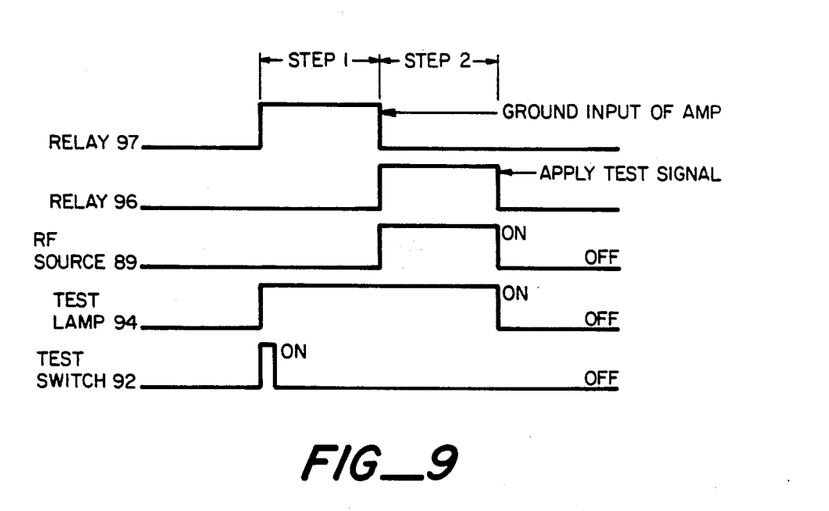
FIG. 9 is a timing diagram showing the application of a test signal to the monitoring system of FIG. 2.

A timing diagram for the test sequence is given in FIG. 9. The sequence consists of two steps of approximately equal duration, e.g. 15 seconds.

RF power from source 89 is applied to the input of impedance matching amplifier 51 through T-connector 52 and a relay 96 which is controlled by the sequence controller. A second relay 97 controlled by the test sequence controller grounds the input of the impedance matching amplifier during the first step of the test. In the embodiment illustrated, relays 96 and 97 are mounted in a shielding enclosure with amplifier 51.

A test sequence is initiated by momentarily closing switch 92 or by applying an external signal to the controller. Upon closure of the switch or receipt of the external signal, test lamp 94 is illuminated, and relay 97 is actuated to ground the input of amplifier 51. At this point, RF level meter 71 should read 0. During this first step, operating power is removed from RF source 89, and the output of this source is grounded by relay 96.

At the end of the first step, the relays change state, and operating power is applied to RF source 89. When the relays change state, the input of amplifier 51 is ungrounded, and the output of the RF source is connected to the input of this amplifier by relay 96. The test signal source remains connected to the input amplifier for a period which is long enough to activate both the warning level alarm and the shutdown level alarm and to allow acknowledgement of these alarms. The amplitude of the test signal is sufficient to drive the RF level meter to full scale.

At the end of the second step of the test sequence, relay 96 disconnects the RF power source from the input amplifier, and the RF source is turned off. At this time, test lamp 94, which remains illuminated throughout the test sequence, is extinguished.

The test sequence can be run automatically at regular intervals by applying a periodic signal to the external test signal inputs of controller 91 to initiate the test sequence at the desired intervals.

Operation and use of the arc detection system, and therein the method of the invention, are as follows. The system is installed and connected to a machine such as a turbine generator in the manner described above. RF voltages on the neutral lead of the generator are applied to the monitor by voltage coupler 17, and signals within he desired frequency range are passed by bandpass filter 59. Storage capacitor 66 is charged to a level corresponding to the peak level of the RF pulses, and the RF level is displayed by meter 81.

If the level of the RF signal exceeds the warning level set by potentiometer 78, threshold detector 73 delivers an output signal to transient alarm filter 74. If this signal exceeds the delay interval set by time base generator 77, it passes through the filter to logic circuit 76. The logic circuit flashes light 83 to indicate that a change in the radio frequency activity has occurred. This light continues to flash until the existence of the alarm condition is acknowledged by an operator by manual activation of acknowledge switch 87. Light 83 then glows steadily until the RF level drops to a level below the threshold level. If the RF level drops below the threshold level before acknowledgement has occurred, the light is extinguished upon activation of the acknowledge switch.

In the event that the RF level exceeds the shutdown level set by potentiometer 79, threshold detector 73 delivers a shutdown signal to filter 74. If the duration of this signal exceeds the delay period set by time base generator 77, it passes through the filter to logic circuit 76. Upon receipt of this signal, the logic circuit causes light 84 to flash to indicate the occurrence of severe internal arcing in the generator. This light continues to flash until existence of the arcing condition is acknowledged by manual activation of acknowledge switch 88. Thereafter, the light glows steadily until the RF level drops back below the shutdown threshold level. If the RF level falls below the threshold level before the operator activates the acknowledge switch, the light continues to flash until the switch is actuated, at which point it is extinguished.

The system can be tested at any time by actuation of test switch 92, and it can be tested automatically at regular intervals by applying a periodic test signal to the external test signal inputs of test sequence controller 91.

The voltage coupler system and method have been found to be substantially more sensitive than RF current monitoring in detecting arcing faults. Tests were conducted with a voltage coupler of the type shown in FIGS. 3-4 in conjunction with an impedance matching amplifier and a spectrum analyzer at a power station to obtain RF measurements on an 835 MVA fossil fired generator. With the generator on-line at a gross load of 725 MW, the RF voltage spectrum was measured over the frequency range of 5 KHz to 10 MHz. Arcing was simulated by an AC arcing relay and a sine wave sweep generator connected between adjacent phases at the line end of the generator stator. Measurements were taken both with and without the simulated arcing to obtain both arc simulation RF data and on-line background RF data. Using this data, the AC arc voltage sensitivity of the system was calculated.

The AC arcing simulation signal measured at the generator neutral was higher than the background RF signal over the frequency range of 1 MHz to approximately 6 MHz. A 6 volt RMS arcing relay connected to the line terminals of the generator caused the neutral RF voltage to peak at a signal level of $-56$ dBm at a frequency of 3 MHz. The background level of RF noise voltage with generator on-line reached a level of $-880$ dBm. Using these two measured signal levels of neutral RF and the criteria that the minimum detectable signal level caused by generator stator arcing is 20 dBm above the background RF noise level, a minimum detectable value of AC arc voltage developed by a stator winding arcing condition was calculated. Based on the measured background RF noise voltage of $-80$ dBm, a minimum detectable RF arcing signal of $-60$ dBm is required. The minimum detectable magnitude of AC arc voltage which will produce a measured neutral signal of $-60$ dBm is:

$$V_{min} = 6 \text{ VRMS } (224^{\mu V}/400^{\mu V}) = 3.36 \text{ VRMS}$$

Using similar calculations, the minimum level of arc voltage which can be detected by monitoring the neutral current was determined to be 86 volts RMS. These calculations show that the arc detection sensitivity of the RF voltage coupler is over 25 times that of the current monitoring technique.

It is apparent from the foregoing that a new and improved system and method for detecting arcing faults in a dynamoelectric machine have been provided. While only certain presently preferred embodiments have been described in detail, as will be apparent to those familiar with the art, certain changes and modifications can be made without departing from the scope of the invention as defined by the following claims.

We claim:

1. In a system for detecting an arcing fault in a dynamoelectric machine having a neutral grounding lead: a radio frequency voltage coupler coupled to the neutral lead, a radio frequency monitor coupled to the voltage coupler for monitoring radio frequency voltage in the neutral lead, and an alarm circuit coupled to the radio frequency monitor for providing a warning signal in response to a change in the radio frequency voltage and a shutdown signal in response to a radio frequency voltage greater than a predetermined level.

2. The system of claim 1 wherein the voltage coupler is capacitively coupled to the neutral lead.

3. The system of claim 1 including an impedance matching amplifier having a high input impedance and a low output impedance connected between the voltage coupler and the radio frequency monitor.

4. The system of claim 1 wherein the radio frequency monitor includes a bandpass filter for passing radio frequency signals within a predetermined frequency range and a wideband amplifier responsive to signals passed by the bandpass filter.

5. The system of claim 4 wherein the bandpass filter has a passband on the order of 2–10 MHz, and the wideband amplifier has a frequency response on the order of 100 KHz–10 MHz.

6. The system of claim 1 wherein the radio frequency monitor includes a peak detector which provides an output signal corresponding to the peak value of the radio frequency voltage in the neutral lead.

7. The system of claim 6 wherein the peak detector comprises a storage device, means for applying a signal to the storage device when triggered, and means for comparing the signal in the storage device with a signal corresponding to the radio frequency voltage in the neutral lead and triggering the means for applying a signal to the storage device when the signal corresponding to the radio frequency voltage differs from the signal in the storage device.

8. The system of claim 7 wherein the storage device comprises a capacitor, and the means for applying a signal to the storage device comprises a one-shot multivibrator.

9. The system of claim 1 including means for adjusting the sensitivity of the alarm circuit to changes in the radio frequency voltage and means for adjusting the level at which the shutdown signal is provided.

10. The system of claim 1 including a radio frequency test signal source, and means for applying a signal from the source to the radio frequency monitor to test the operation of the monitor.

11. In a system for detecting an arcing fault in a dynamoelectric machine having a neutral grounding lead: a capacitive voltage coupler coupled to the neutral lead responsive to radio frequency voltages produced in the neutral lead by arcing in the machine, an amplifier having a high input impedance connected to the voltage coupler, a bandpass filter for selectively passing radio frequency signals within a predetermined frequency range from the amplifier, a storage capacitor, means responsive to the level of the signal from the bandpass filter and to the charge on the storage capacitor for applying pulses to the storage capacitor when the level of the signal from the filter is less than the charge on the capacitor, and an alarm circuit coupled to the storage capacitor for providing a warning signal in response to a change in the charge on the capacitor and a shutdown signal in response to a charge on the capacitor greater than a predetermined level.

12. The system of claim 11 wherein the means for applying pulses to the storage capacitor includes a comparator which monitors the level of the signal from the filter and the charge on the storage capacitor and delivers an output signal when the signal from the filter is below the charge on the capacitor, and a one-shot multivibrator connected between the comparator and the storage capacitor for applying pulses to the capacitor in response to the output signal from the comparator.

13. The system of claim 11 including means for adjusting the sensitivity of the alarm circuit to changes in the charge on the capacitor and means for adjusting the level at which the shutdown signal is provided.

14. The system of claim 11 including a radio frequency test signal source, and means for applying a signal from the source to the amplifier to test the operation of the system.

15. In a method of detecting an arcing fault in a dynamoelectric machine having a neutral grounding lead, the steps of: monitoring the neutral lead for a radio frequency voltage produced by arcing in the machine, providing a warning signal in response to a change in the radio frequency voltage, and providing a shutdown signal in response to a radio frequency voltage greater than a predetermined level.

16. The method of claim 15 including the step of capacitively coupling a voltage coupler to the neutral lead.

17. The method of claim 15 including the step of passing a signal corresponding to the radio frequency voltage through a bandpass filter to eliminate signals outside a predetermined frequency range.

18. The method of claim 17 including the step of passing a signal corresponding to the radio frequency voltage through a bandpass filter to eliminate signals outside a frequency range on the order of 2–10 MHz.

19. The method of claim 15 including the step of monitoring the peak of the radio frequency voltage is monitored.

20. The method of claim 19 including the steps of storing a signal in a storage device, monitoring the level of the radio frequency voltage, and applying a signal to the storage device to increase the level of the stored signal in the event that the stored signal is below a predetermined level relative to the radio frequency voltage.

21. The method of claim 20 including the steps of storing the signal in a capacitor, comparing the charge on the capacitor with the level of a signal corresponding to the radio frequency voltage, and adding charge to the capacitor if the charge on the capacitor is less than the level of the signal corresponding to the radio frequency voltage.

22. The method of claim 15 including the steps of providing a radio frequency test signal, and periodically monitoring the test signal instead of the radio frequency voltage.

* * * * *